United States Patent
Gandhi et al.

(10) Patent No.: US 12,314,930 B2
(45) Date of Patent: *May 27, 2025

(54) SYSTEM AND METHOD FOR FACILITATING ELECTRONIC FINANCIAL TRANSACTIONS DURING A COMMUNICATION SESSION

(71) Applicant: PayPal, Inc., San Jose, CA (US)

(72) Inventors: Saumil Ashvin Gandhi, Sunnyvale, CA (US); Ray Hideki Tanaka, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,226

(22) Filed: May 15, 2023

(65) Prior Publication Data
US 2023/0368176 A1 Nov. 16, 2023

Related U.S. Application Data

(63) Continuation of application No. 17/341,118, filed on Jun. 7, 2021, now Pat. No. 11,687,908, which is a continuation of application No. 16/190,033, filed on Nov. 13, 2018, now Pat. No. 11,030,607, which is a continuation of application No. 13/330,374, filed on Dec. 19, 2011, now Pat. No. 10,127,540.

(51) Int. Cl.
*G06Q 20/32* (2012.01)
*G06Q 40/02* (2023.01)

(52) U.S. Cl.
CPC .......... *G06Q 20/326* (2020.05); *G06Q 40/02* (2013.01)

(58) Field of Classification Search
CPC .................................................... G06Q 40/02
USPC .......................................................... 705/39
See application file for complete search history.

(56) References Cited

U.S. PATENT DOCUMENTS 5,522,089 A   5/1996   Kikinis et al.
6,169,890 B1  1/2001   Vatanen
(Continued)

FOREIGN PATENT DOCUMENTS

KR   100639906 B1   10/2006

OTHER PUBLICATIONS

Karnouskos S., et al., "Mobile Payment: A Journey Through Existing Procedures and Standardization Initiatives," IEEE Communications Surveys & Tutorials: Fourth Quarter, 2004, vol. 6, No. 4, pp. 44-66.

*Primary Examiner* — Sara C Hamilton
(74) *Attorney, Agent, or Firm* — HAYNES AND BOONE, LLP

(57) ABSTRACT

A payment button on a device capable of making telephone calls, such as a mobile phone, allows a payer to electronically transfer money while in a phone call with a payee. The payment button also allows a payee to initiate an electronic payment transaction while in a phone call with a payer. The payment button may be a clickable or tappable virtual button presented on a display of the phone when being used to make or receive a call. The payer or the payee can simply enter a payment amount on the phone to complete an electronic payment transaction. A notification of payment is instantly transmitted to the phones being used for the phone call, so that the parties can safely and conveniently conclude a purchase and/or payment transaction during one phone call.

20 Claims, 12 Drawing Sheets

(56) References Cited

U.S. PATENT DOCUMENTS

| | | |
|---|---|---|
| 6,755,744 B1 | 6/2004 | Nathan et al. |
| 7,575,177 B2 | 8/2009 | Killian et al. |
| 7,988,060 B2 | 8/2011 | Killian et al. |
| 8,145,568 B2 | 3/2012 | Rackley, III et al. |
| 8,249,965 B2 | 8/2012 | Tumminaro |
| 8,374,916 B2 | 2/2013 | White |
| 8,662,401 B2 | 3/2014 | Skowronek et al. |
| 10,127,540 B2 | 11/2018 | Gandhi et al. |
| 10,163,171 B1 | 12/2018 | Vippagunta et al. |
| 2004/0030601 A1 | 2/2004 | Pond et al. |
| 2007/0011104 A1 | 1/2007 | Leger et al. |
| 2007/0027803 A1 | 2/2007 | Brandes et al. |
| 2007/0233615 A1 | 10/2007 | Tumminaro |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1* | 11/2007 | Tumminaro .......... G06Q 20/10 705/79 |
| 2007/0291789 A1 | 12/2007 | Kutt et al. |
| 2008/0177661 A1 | 7/2008 | Mehra |
| 2009/0090783 A1 | 4/2009 | Killian et al. |
| 2009/0094123 A1 | 4/2009 | Killian et al. |
| 2009/0094125 A1 | 4/2009 | Killian et al. |
| 2009/0112768 A1 | 4/2009 | Hammad et al. |
| 2009/0204518 A1 | 8/2009 | Vilmos |
| 2009/0240626 A1 | 9/2009 | Hasson et al. |
| 2009/0319425 A1 | 12/2009 | Tumminaro et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0145861 A1 | 6/2010 | Law et al. |
| 2010/0191645 A1 | 7/2010 | Hougland et al. |
| 2010/0235283 A1 | 9/2010 | Gerson |
| 2010/0291895 A1 | 11/2010 | Drzyzga et al. |
| 2010/0312703 A1 | 12/2010 | Kulpati et al. |
| 2011/0021175 A1 | 1/2011 | Florek et al. |
| 2011/0035319 A1 | 2/2011 | Brand et al. |
| 2011/0213707 A1 | 9/2011 | Jackson et al. |
| 2011/0276418 A1 | 11/2011 | Velani |
| 2011/0295750 A1 | 12/2011 | Rammal |
| 2011/0320347 A1 | 12/2011 | Tumminaro et al. |
| 2012/0011007 A1 | 1/2012 | Blewett et al. |
| 2012/0047067 A1 | 2/2012 | Hogl |
| 2012/0095853 A1 | 4/2012 | Von Bose et al. |
| 2012/0116967 A1 | 5/2012 | Klein et al. |
| 2012/0209768 A1 | 8/2012 | Nuzzi |
| 2012/0209772 A1 | 8/2012 | Nuzzi et al. |
| 2013/0013490 A1 | 1/2013 | Keller et al. |
| 2013/0024366 A1 | 1/2013 | Mukherjee et al. |
| 2013/0030986 A1 | 1/2013 | Agarwal et al. |
| 2013/0060678 A1 | 3/2013 | Oskolkov et al. |
| 2013/0060690 A1 | 3/2013 | Oskolkov et al. |
| 2013/0159170 A1 | 6/2013 | Gandhi et al. |
| 2019/0251543 A1 | 8/2019 | Gandhi et al. |

* cited by examiner

SYSTEM AND METHOD FOR FACILITATING ELECTRONIC FINANCIAL TRANSACTIONS DURING A COMMUNICATION SESSION

CROSS-REFERENCE TO RELATED APPLICATIONS

This application is a continuation of U.S. patent application Ser. No. 17/341,118, filed Jun. 7, 2021, which is a continuation of U.S. patent application Ser. No. 16/190,033, filed Nov. 13, 2018, now U.S. Pat. No. 11,030,607, which is a continuation of U.S. patent application Ser. No. 13/330,374, filed Dec. 19, 2011, now U.S. Pat. No. 10,127,540, issued Nov. 13, 2018, which are herein incorporated by reference in their entirety.

BACKGROUND

Technical Field

The present invention generally relates to facilitating electronic commerce over a network and, more particularly, for facilitating the use of smart telephones in financial transactions.

Related Art

Consumers and the general population own and use mobile phones with enhanced capabilities, also known as smart phones, more than ever before. The number of users, devices, and device capabilities continue to increase. One of the reasons for this increase is the capability of these phones to expand the mode of communication beyond simple voice conversation. Developers can provide smart phone applications ("apps") that augment voice communication in various ways. For example, apps can allow users to make video calls, share photos and videos, play games together, and carry out electronic transactions with each other, such as sending and receiving money.

At the same time, more and more people rely on payment service providers, such as PayPal, Inc. of San Jose, CA, to send and receive payments. Such payment service providers can make transactions easier and safer for the parties involved. For online purchases, online merchants typically provide a checkout link or button for accessing a payment service provider from the merchants' webpage, making it convenient for consumers to complete online purchases through payment service providers. The convenience provided through such integration is one main reason why online purchases and use of payment service providers have become popular.

However, a large number of purchase orders are still placed over a telephone conversation. For example, orders for food delivery are typically made verbally over a phone call. Promises to buy and sell between ordinary non-merchant parties are typically made verbally over a phone call also, since non-merchant sellers are not likely to have an online checkout page. In fact, some consumers may actually prefer to make a purchase agreement over a phone conversation, since questions they may have about the purchase can be asked and answered in real time to facilitate a purchasing decision.

Even though these over-the-phone transactions would benefit greatly from the safety and convenience provided by payment service providers, and even though many people own smart phones that are capable of accessing payment service providers, over-the-phone transaction typically are not completed through payment service providers. One of the main reasons is that unlike online merchant websites, the lack of integration makes it cumbersome for users to access payment service providers during a phone call.

Thus, there is a need for integrated access to payment service providers to facilitate electronic payment transactions during a phone call.

SUMMARY

According to one embodiment, a button or link is provided on a display of a user's mobile phone during a phone call with another party, where the user may select the button or link to make a payment request to or from that party during the call. The button may be provided through an app or service from a payment provider, where the payment request to or from the user is processed through the payment provider.

According to one embodiment, an in-call payment application on a payer's mobile phone presents a custom in-call screen having a clickable or tappable payment button on the display of the mobile phone when the payer calls a payee or receives a call from a payee. After the payer and the payee verbally agree on the purchase price, the payer may tap or click on the payment button to activate a payment handler module. The payment handler prompts the payer to enter the payment amount and the user identifier ("ID") of the payee. If the user ID of the payee, e.g., the payee's email address, is stored in the address book of the payer's mobile phone, the application retrieves it so that the payee's user ID is automatically entered in the payment handler prompt. Once all the information is entered, a payment request, which comprises the payment amount and the payee's user ID, is transmitted to a payment service provider over a data network. The payment service provider processes the payment request, and then sends a notification to the payee once the payment request has been processed. The notification may be sent via Short Message Service ("SMS") text, email, and/or voice alert. If the payee's device is also a mobile phone running an in-call payment application, the notification may be received by the application so that the notification may be presented on the display of the payee's device.

In another embodiment, the payee may trigger the payment handler on the payer's device. In one embodiment, the payee device is also a mobile phone running an in-call payment application. The payee can click or tap the payment button to activate a payment handler, then choose a request payment option in the payment handler to enter the requested amount. Once the requested amount is entered, the payee's device can send an activation command, along with the requested amount and the payee's user ID, to the payment handler on the payer's device via in-band signaling, such as Dual-Tone Multi-Frequency ("DTMF") signaling, over a voice call network. Internet protocol ("IP") over a data network may also be used to transmit the command, in which case the user ID of the payer is entered by the payee or automatically retrieved by the application if it is stored in an address book of the payer device. In response to the activation command, the payment handler on the payer's device displays the payment request information and prompts the payer for approval. If the payer approves, the payment request is sent to a payment service provider for processing and notification.

In another embodiment, the payee's device may be a landline phone. The landline phone may be enhanced with capabilities to display prompts and allow the payee to enter a requested amount and user IDs, as well as to communicate via in-band signaling over voice channels and/or IP. In yet another embodiment, an add-in module to a conventional landline phone may have these capabilities. In either embodiment, the landline phone can be used in place of a smart phone to trigger the payment handler on the payer's device.

By providing a payment button on the in-call screen and/or on the phone, the payer can conveniently access a payment service provider to complete a transaction while still on the phone. Also, by instantly notifying the payee, the payee can be assured that a payment has been received even before ending the phone call. Moreover, since user IDs may be automatically retrieved from address books, all that the payer or the payee needs to do may be simply tap on a button and enter a payment amount in order to safely complete a payment transaction while on the phone.

These and other features and advantages of the present invention will be more readily apparent from the detailed description of the embodiments set forth below taken in conjunction with the accompanying drawings.

Figure 1:
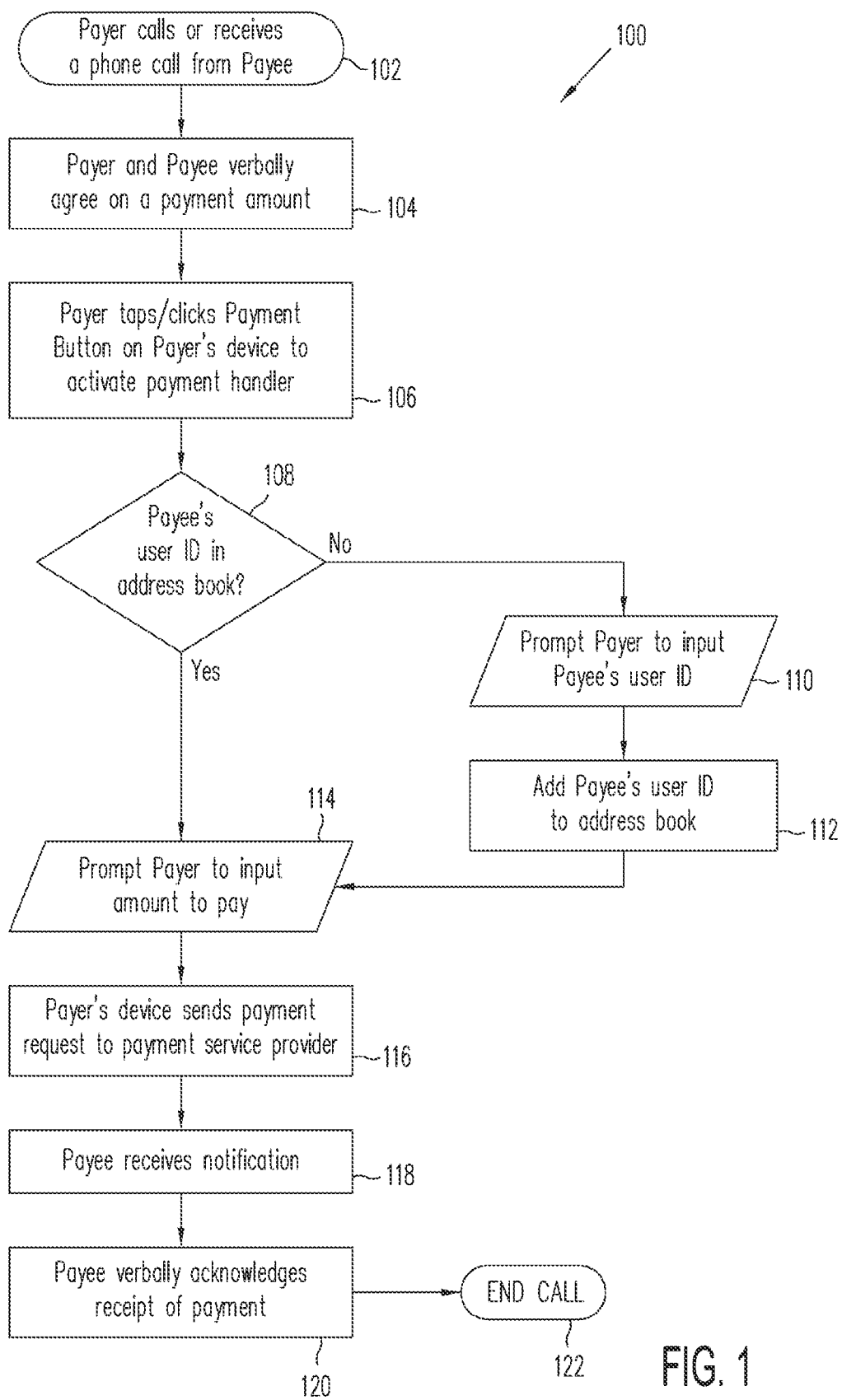
FIG. 1 is a flowchart illustrating steps in which a payer-initiated electronic payment transaction during a phone call is handled according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 illustrating steps in which a payer-initiated electronic payment transaction during a phone call is handled according to one embodiment. The payer may be engaged in a phone call conversation using a user device, which can be a smart mobile phone, a landline phone with a processor, a tablet device, or any other computing device that can also be used to make a telephone call. A user device used by a payer may also be referred to as a payer device in the present disclosure. At step 102, the payer may call to a payee or receive a call from a payee on the payer device. The payer and the payee may then verbally negotiate purchasing and/or payment agreement over the call, which is how a large number of purchasing and/or payment agreements and negotiations are still made these days. For example, orders for food delivery are typically made verbally over a phone call. Purchase and/or payment agreements between non-merchants may also be typically made verbally over a phone call, since the parties may prefer that questions about the purchase and/or payment be asked and answered in real time to facilitate a decision to buy or sell.

At step 104, the payer and the payee may verbally agree on an amount pay to the payer. The payee may verbally convey the requested amount, to which the payer simply agrees, or the parties may verbally communicate their intention to be bound to a payment amount in any other suitable way.

After the parties agree on the payment amount, the payer can tap, click, or push a payment button on the payer device to activate a payment handler during the phone call in step 106. Note that step 104 may be omitted, and the payer may simply select the payment button to initiate a payment without any verbal agreement during the call. In this embodiment, the payment button may be a soft key or button presented on a display of the payer device such as a smart mobile phone. For example, an application (more commonly called "app") on a smart mobile phone can provide a custom dial pad and in-call screen that the payer and the payee can use when making or receiving calls. Such an app may be referred to as in-call payment app in the present disclosure. The in-call payment app can provide a soft payment button on the dial pad or in-call screen when the parties are engaged in a phone call. The soft payment button may be clickable with a pointing device, and may also be tappable if the display is touch-sensitive. Alternatively, the in-call payment app may assign one or more programmable physical buttons to function as the payment button. In other embodiments, the payment button may be a physical button that is programmed or hardwired to activate the payment handler. In any case, these embodiments are meant to be merely exemplary, and one of skill in the art will recognize that there may be a variety of other means, within the scope of present disclosure, for receiving a user's command to activate, invoke, or trigger a software or hardware procedure while the device is being used for a phone call. One such means may be a voice command.

In various embodiments, the payment handler may be a software module, process, subroutine, or function that causes a processor of the payer device to receive information about a payment to be made, such as the payment amount and the user identifier ("ID") of the payee, and generate a payment request to be transmitted to and processed by a payment service provider ("PSP") such as PayPal, Inc. of San Jose, CA. For example, PayPal Mobile Payments Library from PayPal, Inc., which is a collection of software modules and corresponding application programming interface ("API") for allowing users to send and request money via PayPal from smart phones, may serve as a basis for a payment handler. In some embodiments, the payment handler may be implemented in hardware to perform similar functions.

Once the payer activates, invokes, or triggers the payment handler by tapping on the payment button or by other means, the in-call payment app may search an address book stored in the payer device to retrieve the user ID of the payee (e.g., the payee's email address) based on the dialed number or the incoming number, at step 108. If the user ID can be retrieved, the in-call payment app may then transmit the user ID to the payment handler for use in generating the payment request. Thus, the payer can conveniently send payments without having to type in the payee's user ID. If the user ID cannot be retrieved from the address book, the in-call payment app or the payment handler prompts the payer to enter the user ID of the payee at step 110, and saves the user ID for later use in the address book at step 112.

In some embodiments, the payee's phone number may also serve as an alternate user ID. In those embodiments, steps 110 through 112 may be skipped since the payee's phone number obtained from the dialed or incoming number can be used to generate a payment request. When the payment request based on the payee's phone number fails to be processed by the PSP, for example because the payee has not registered his or her phone number with the PSP, steps 110 through 112 may need to be performed on the second try.

At step 114, after the payee's user ID is received, the payment handler prompts the payer to enter the payment amount, such as by entering into a field using a keyboard or keypad or by voice. The payment handler then generates a payment request based on the payment amount and the payee's user ID. At step 116, the generated payment request is transmitted from the payer device over a network to the PSP for payment processing, such as through an API call. In this embodiment, the payment handler may transmit the payment request via application layer protocol such as HTTP or Simple Object Access Protocol ("SOAP") implemented on top of the Internet Protocol ("IP"). However, one of skill in the art will appreciate that any other suitable protocol for sending and receiving structured data over a network may be utilized without departing from the scope of the present disclosure.

Note also that the payer's user ID and credentials (e.g., password or PIN) may also be required for payment processing by the PSP. However, there is no need for the payer to enter user ID and password every time a payment is made via the in-call payment app, since the information can be entered once and stored in the app when the app is first installed on the payer device. Optionally, for added security, the payment handler or the in-call payment app may perform a step of asking for a password every time a payment request is transmitted. In some embodiments, a unique identifier of the payer's device registered with the PSP (e.g., hardware ID or phone number) can serve as an alternate to the user ID and password, and can be transmitted in place of, or in addition to, the payer's user ID and/or password.

Figure 3:
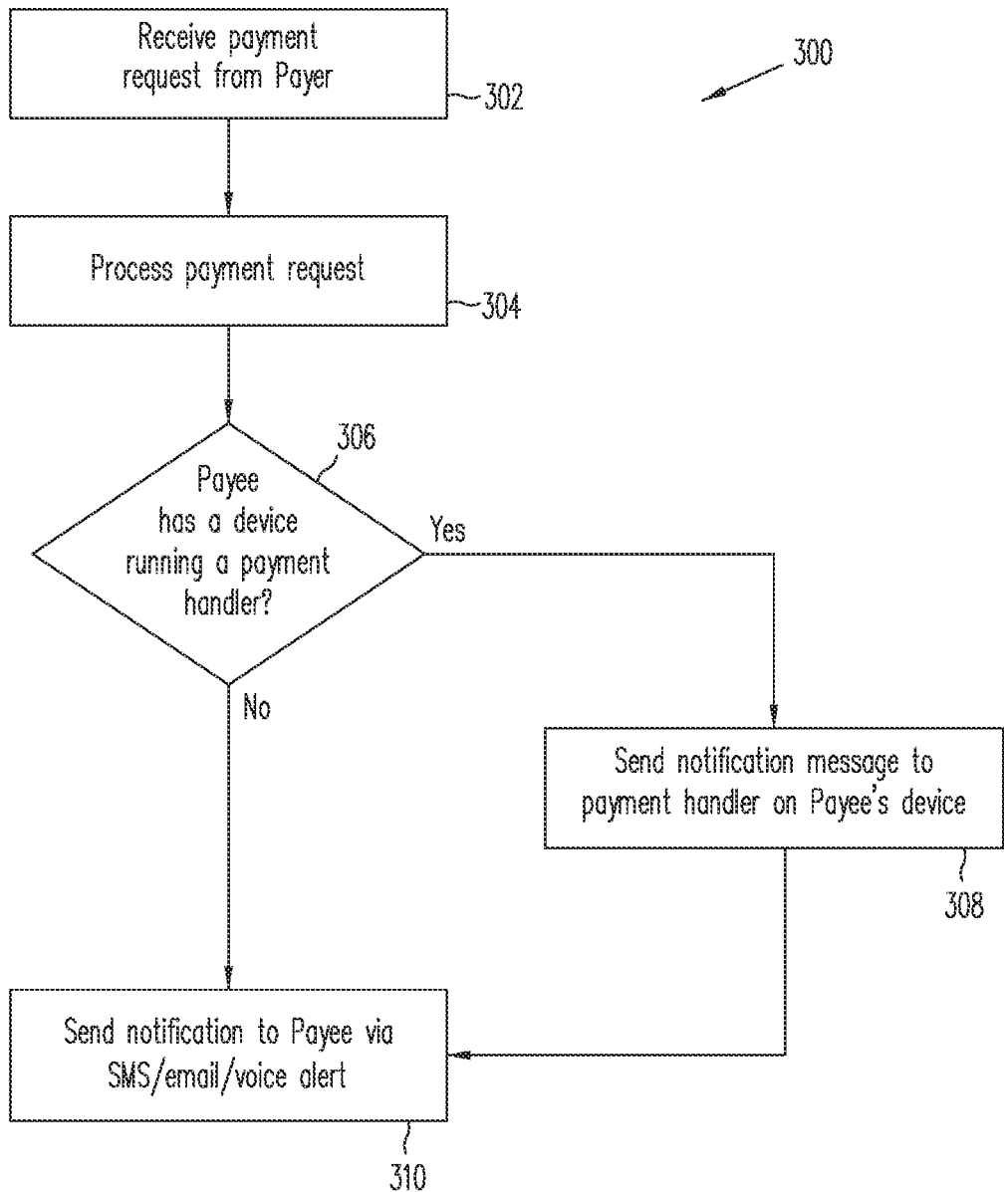
FIG. 3 is a flowchart illustrating steps for a payment service provider in handling an electronic payment transaction initiated during a phone call according to one embodiment.

Referring now to FIG. 3, which is an exemplary flowchart 300 illustrating steps a payment service provider performs in handling an electronic payment transaction initiated during a phone call, the payment request transmitted from the payer device in step 116 above is received by the PSP in step 302. At step 304, the payment request is processed, for example, by verifying the account information of the payer and the payee, adding funds to the payer's account from authorized funding sources, debiting the payer's account, and crediting the payee's account accordingly.

Once the payment is processed, a notification may be sent to the payee. At step 306, the account information of the payee may be checked first to see if the payee has registered with the PSP a user device running a payment handler, mobile payment app (e.g., PayPal Mobile app), an in-call payment app, or other similar software or hardware process capable of communicating directly with the PSP. A user device may be registered with the PSP when such an app is first run on the device. The process of registering a user device with a server is known in the art and thus will not be discussed herein.

If a registered user device is found in the payee's account information, the PSP may directly communicate the notification over a network to the payee's user device in step 308, so that the payee's device can present the notification through a pop-up message, a sound alert, or any combination of these and other suitable means for conveying the notification while the payee is still using the device in a phone call with the payer. If supported by the device, the notification may also be sent to the device via push notification mechanism such as the one described in Bell et al., US 2010/0227632, incorporated by reference in its entirety.

At step 310, the notification may be sent to the payee utilizing other means of communicating a message to the payee regardless of whether the payee has a device running an app registered with the PSP. For example, a Short Message Service ("SMS") text may be sent so that the payee can receive the notification on the mobile phone being used in the phone call with the payer. An email may also be sent to the payee for notification. In another example, an automated voice response may be injected into the audio stream of the phone call so that the payee can hear a voice notification while on the phone. The PSP may also call the payee on the phone to deliver the automated voice response, which the payee can pick up and hear if the payee's phone has a call-waiting enabled. For added security, the notification message in these examples may include a secret message for the payee, as described in the commonly-assigned patent application publication US 2009/0327099 by Patel et al., incorporated by reference in its entirety. Optionally, a notification may also be sent to the payer by performing steps similar to steps 308 and 310 described above.

Referring back to FIG. 1, at step 118, the payee receives the notification sent by the PSP as described above. The payee can then be assured that the payer made the payment as promised, and verbally acknowledge receipt of the payment while still on the phone with the payer, at step 120. With the assurance that the payment has been received, the payee may initiate transfer of goods or services to the payee. The payer can be assured that the payee, having been paid as promised, would start the delivery of goods or services. Thus, the process described above enables users of PSPs to make purchases and payments safely and conveniently in one integrated transaction over one phone call.

Note that the methods and system in the present disclosure assume that the payer and the payee have accounts with the PSP. If one or both parties do not have an account, one may be created prior to taking advantage of the benefits provided by the methods and system disclosed herein, by supplying information such as a funding account number, a password, a user name, an email address, and a phone number to the PSP. An account may be created, for example, when the payer first installs the in-payment app described above. Account creation is known in the art and will not be discussed further herein.

Figure 2:
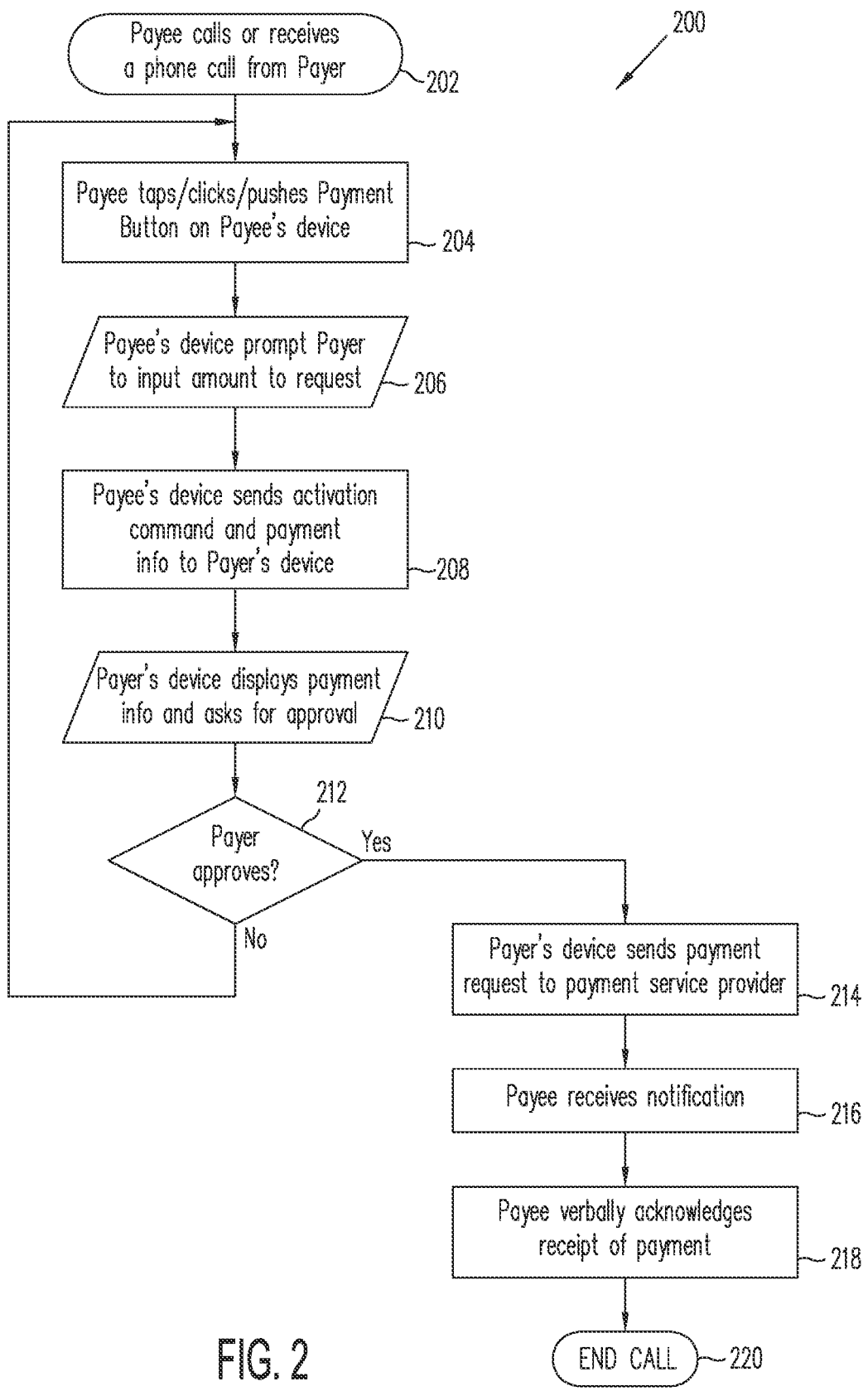
FIG. 2 is a flowchart illustrating steps in which a payee-initiated electronic payment transaction during a phone call is handled according to one embodiment.

Referring now to FIG. 2, a flowchart 200 of steps in which a payee, as opposed to a payer, initiates an electronic payment transaction is illustrated. Both the payer and the payee may be engaged in a phone call conversation using a user device, which can be a smart mobile phone, a landline phone with a processor, a tablet device, or any other computing device that can also be used to make or receive a telephone call. A user device of a payee may also be referred to as a payee device in the present disclosure. At step 202, the payee may call a payer or receive a call from a payer on the payee device, and verbally negotiate a purchasing and/or payment agreement (if desired) over the call as described for step 102 above.

In contrast to the payer activating a payment handler to initiate payment in step 106 above, in step 204, the payee may tap, click, push, or otherwise select a payment request button on the payee device to request payment from the payer. In one embodiment, the payment request button may be provided by the payee device running the in-call payment app described in connection with step 106 above. The payment request button may be presented on the same display as a payment button, or it may be presented after the payee taps, clicks, or pushes the payment button. In another embodiment, the payee device may be a landline phone with a programmable or hardwired button to function as the payment request button. The landline phone may be enhanced with capabilities to display prompts and allow the payee to enter a requested amount after the payee presses the payment request button. In yet another embodiment, an add-in module to a conventional landline phone may provide the payment request button and the input/output capabilities.

After the payee taps, clicks, or pushes the payment request button, the payee device prompts the payee to enter the requested amount at step 206, such as through a keyboard, keypad, drop down menu, voice, or other means. While the information to be transmitted to the payer device includes both the requested amount and the payee's user ID, only the requested amount may need to be entered since the payee's user ID may already be stored in the payee device for reuse. Once the requested amount is entered, at step 208 the payee device can send an activation command, along with the payment information (i.e., the requested amount and the payee's user ID), to the in-call payment app running on the payer's device. The activation command and the payment information may be transmitted via in-band signaling over a voice call channel, for example via Dual-Tone Multi-Frequency ("DTMF") signaling. Because in-band signaling such as DTMF signaling allows transmission of data and/or command over a voice channel, no connection other than a phone call may be required, allowing even non internet-enabled payee devices, such as a landline phone, to initiate electronic payment transactions. One of skill in the art will recognize that any suitable in-band signaling method other than DTMF signaling may be utilized for practicing the methods and systems disclosed herein without departing from the scope of the present disclosure. For example, as wideband audio or high-definition voice ("HD-voice") technology currently employed in some telephone networks gains wider acceptance, in-band signaling can be accomplished using high frequency tones ("HF tones") so that the signaling tones would not interfere with audible voice communication between callers.

The in-call payment app running on the payer device can monitor the phone call between the parties and activate, trigger, or invoke the payment handler on the payer device if an appropriate in-band tone signal is detected. In another embodiment, a payment service provider that is acting as a relay may monitor and detect in-band tone signals such as DTMF signals. In such an embodiment, phone calls dialed on the payer device or the payee device are first connected to a PSP, which then relays the phone call to the dialed number. This allows the PSP relay to monitor the phone call audio stream to detect in-band tone signals. In response to the detected in-band tone signal, the PSP may process a transaction and/or retransmit command and data over the Internet to an IP-enabled payer device. Also, in an embodiment in which the PSP acts as a relay, the PSP may directly inject an automated voice alert or an in-band signal into the phone call audio stream for transmitting a notification described in connection with steps 308 and 310 above.

Optionally, if the payee device is capable, internet protocol ("IP") over a data network may also be used to transmit the activation command and the payment information in place of, or in addition to, in-band signaling. For example, a smart phone with a mobile data connection or an IP-enabled landline phone being used as a payee device may allow the payee to select IP as the transmission protocol. If IP is selected as the transmission mechanism, the payee device may need to obtain the payer's user ID in order to reach the payer device. The payer's user ID may be obtained and/or stored for reuse by performing steps similar to steps 108 through 112 described above. In some embodiments, the payer's phone number may serve as an alternate to the user ID, and may be used in place of, or in addition to, the payer's user ID.

At step 210, the activation command and the payment information is received by the payer device, and in response the payment handler is activated to display the payment information (e.g., the payee's user ID and the payment amount). The payment handler also prompts the payer to approve the payment. Optionally, the payment handler or the in-call payment app may perform a step of asking for a password for added security when the payer approves. Also, if the payee's user ID received by the payer device is not found in an address book, the payee's user ID may be stored in the address book so that the payee's user ID can be automatically retrieved for subsequent transactions.

If the payer approves the payment at step 212, the payment handler generates a payment request based on the payment amount and the payee's user ID received in the payment handler. The transmission of the payment request to a PSP at step 214, as well as the receipt of a notification by the payee at step 216 and a verbal acknowledgement of the payment to close the transaction at step 218, are the same as steps 116, 118, and 120 described above and will not be repeated here in detail. Processing of the payment request and transmission of a notification are performed using the same steps in FIG. 3 as described above for the payer-initiated transaction.

Therefore, according to one aspect of the present invention, the system and methods disclosed herein enable a payee to simply select a button and enter a requested amount to initiate an electronic payment transaction during a phone call with a payer. The payer can simply respond by approving the requested payment displayed on the payer's device, and the parties can safely close the purchase and/or payment transaction in the same phone call after the payee receives a notification that the payment has been processed.

Further, one of skill in the art will recognize that the requested amount may be obtained from the payee in various ways without departing from the scope of the present disclosure. For example, the in-call payment app running on the payee device may communicate with, and obtain a payment amount directly from, a variety of other apps that may be utilized by the payee. These apps may include a calculator app, an inventory management app, or apps that help merchants manage online sales, such as eBay Mobile app by eBay, Inc. of San Jose, CA. These apps may also be integrated into the in-call payment app. In another example, a landline payee device may be linked to an electronic cash register to obtain a payment amount directly from the register. Thus, in these examples, the payee may not need to enter the requested amount into the payee device manually.

Figure 4A:
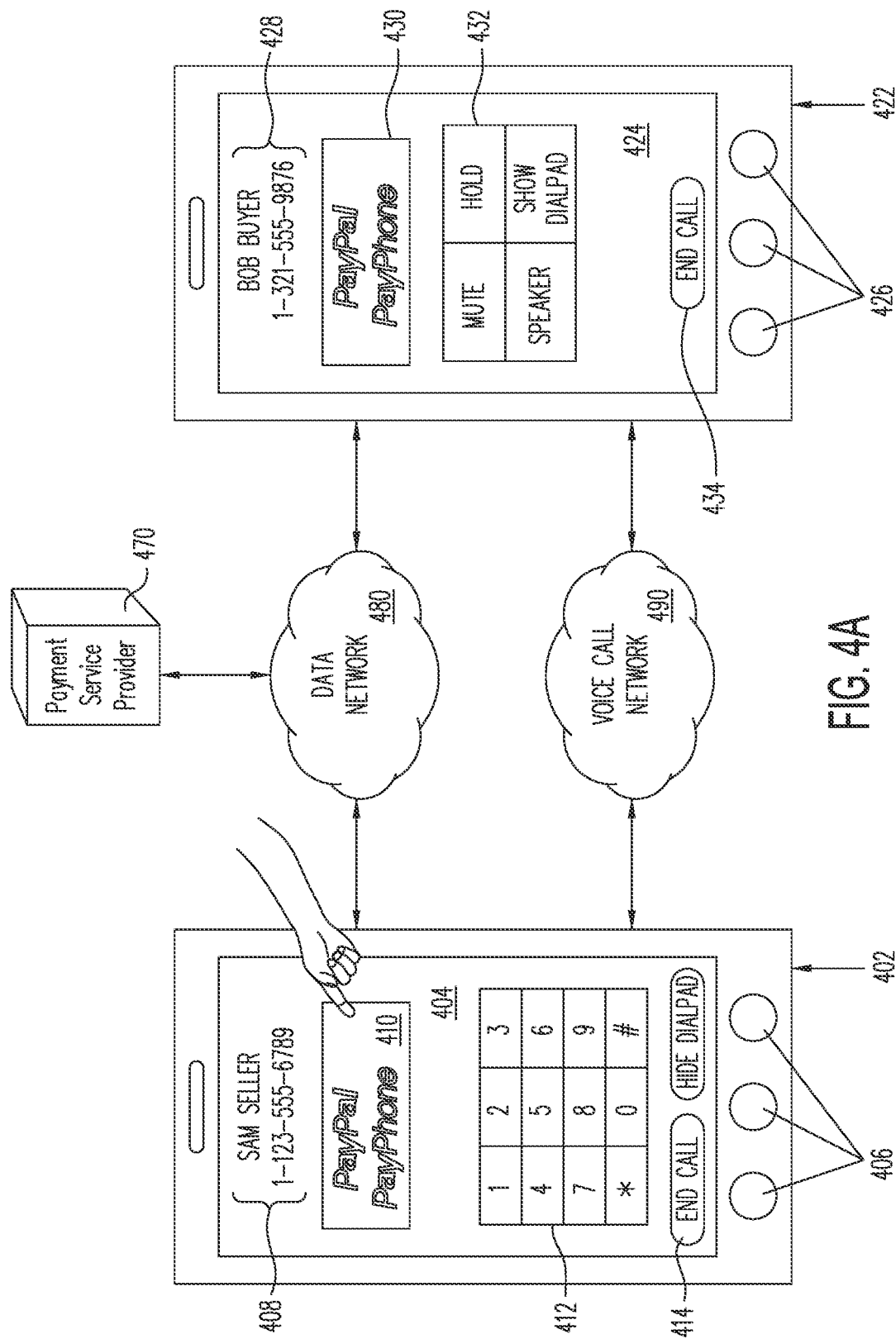
FIGS. 4A to 4C show exemplary screen displays of a payer's device and a payee's device when a payer-initiated electronic payment transaction is being processed during a phone call in an exemplary system.
Figure 4B:
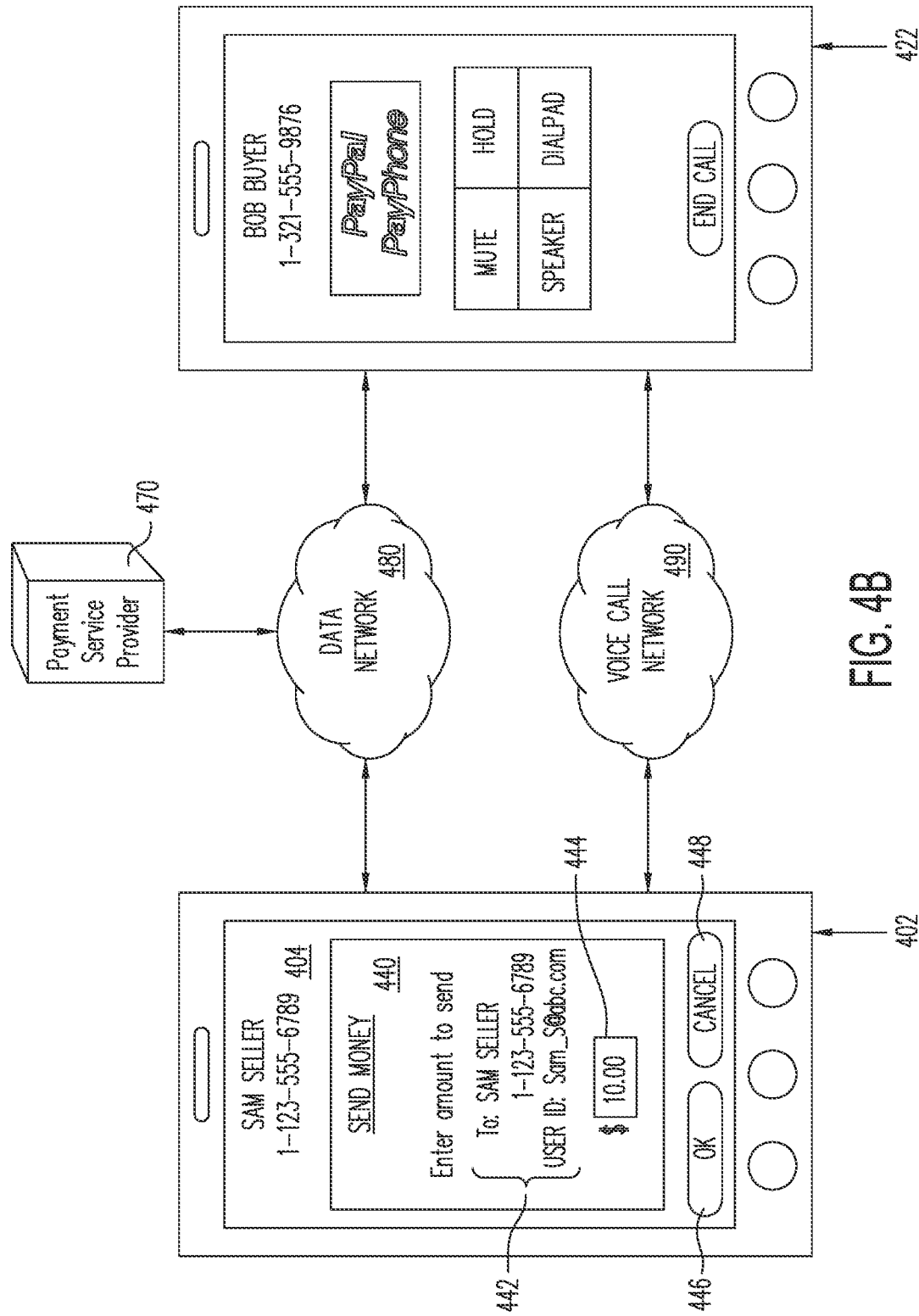
Figure 4C:
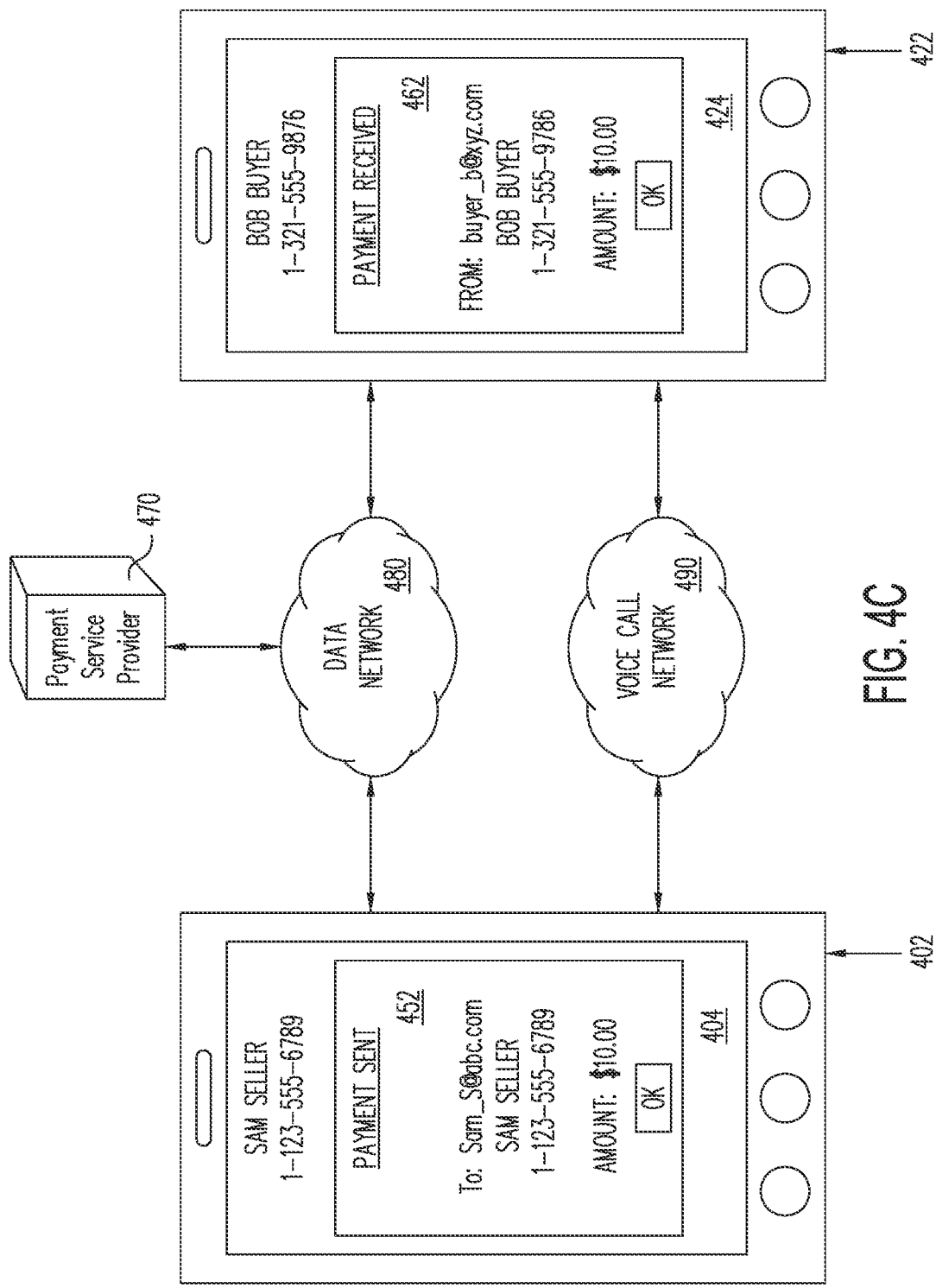

FIGS. 4A to 4C illustrate an exemplary system in which both the payer device and the payee device are mobile phones capable of performing methods for facilitating an electronic payment transaction during a phone call. FIGS. 4A to 4C also show exemplary screen displays with which the payer and the payee may interact while a payer-initiated electronic payment transaction is being carried out.

In FIG. 4A, a payer device 402 and a payee device 422 each comprises a touch-sensitive display 404, 424 and a plurality of programmable buttons 406, 426. The payer device 402 and the payee device 422 are both capable of making and receiving a phone call over a voice call network 490, such as public switching telephone network ("PSTN"), public land mobile network ("PLMN"), cellular network, or any combination of such networks that carry voice communication between mobile devices. The voice call network 490 may also include voice over IP ("VoIP") on a data network comprising LAN, WLAN, and various other wired and wireless networks. The payer device 402 and the payee device 422 also communicate with a payment service provider ("PSP") server 470 over a data network 480 comprising LAN, WLAN, and various other wired and wireless networks such as PLMN and cellular network. The PSP server 470 may be operated by a PSP such as, for example, PayPal, Inc. of San Jose, CA.

One of skill in the art will recognize that the payer device 402 and the payee device 422 are smart mobile phones with touch-sensitive displays and a plurality of programmable buttons that enable the functions discussed above with reference to FIGS. 1 and 2. However, a variety of other computer devices capable of making and receiving phone calls, including portable/mobile devices and desktop devices, may be used without departing from the scope of the present disclosure. The payer device 402 and the payee device 422 may be implemented using any appropriate combination of hardware and/or software configured for voice communication over the voice call network 490 and for data communication over the data network 480. For some embodiments, there may be no need for the payee device 422 to be capable of data communication over the data network 480.

The payer device 402, the payee device 422, and the PSP server 470 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices external to the devices and/or accessible over the data network 480.

When the payer device 402 and the payee device 422 are connected in a phone call, the in-call payment app, discussed above in connection with FIG. 1 above, presents a dial pad or an in-call screen on the display 404, 424. The display 404 of the payer device 402 in FIG. 4A shows an example of a dial pad comprising a caller/callee ID 408 (e.g., the dialed/incoming phone number and the associated name if found in an address book), a payment button 410, a plurality of buttons 412 for other phone functions, and an end call button 414. The display 424 of the payee device 422 shows an example of an in-call screen similarly comprising caller/callee ID 428, a payment button 430, a plurality of buttons 432 for other phone functions, and an end call button 434. Note that a user can alternate between a dial pad or an in-call screen when desired. Note also that a variety of configurations for a custom dial pad or an in-call screen may be used without departing from the scope of the present disclosure.

After verbally negotiating a purchase and/or payment, if desired, the payer can tap on the payment button 410 to activate a payment handler. As discussed above, in other embodiments, one of the plurality of programmable buttons 406 may function as the payment button, or other means of giving command, such as a voice command, may be used to activate a payment handler.

FIG. 4B shows an exemplary screen display on the payer device 402 after the payment handler has been activated. The payment handler presents on the display 404 a prompt window 440 comprising payee information 442, an input box 444 for a payment amount, a confirmation button 446, and a cancel button 448. In this example, the payee's user ID, which is shown in the payee information 442, is automatically retrieved without the payer's input as described above with reference to step 108. Thus, the payer needs only to enter a payment amount in the input box 444 using a virtual keyboard or any other input method natively provided by the operating system of the payer device, and then tap on the confirmation button 446 to send a payment request to the PSP server 470 over the data network 480.

FIG. 4C shows exemplary screen displays on the payer device 402 and the payee device 422 after the PSP server 470 has processed the payment request. In this example, notification of payment is sent out to both the payer and the payee over the data network 480. The in-call payment app on the payer device 402 receives the notification, which may be presented on the display 404 as a popup message 452 containing information regarding the payee and the payment amount. Similarly, the notification may be received by the in-call payment app on the payee device 422, and presented on the display 424 as a popup message 462 containing information regarding the payer and the amount received. In other embodiments, the notification message may be presented on the payee device 422 as a push notification message, an SMS text message, an email, and/or a voice alert, even if the in-call payment is not running.

Referring now to FIGS. 5A to 5D, an exemplary system of facilitating an electronic payment transaction while a smart mobile phone and a landline phone are connected in a phone call is illustrated. FIGS. 5A to 5D also show exemplary screen displays with which the payer and the payee may interact while a payee-initiated electronic payment transaction is being processed according to one embodiment. In this example, the payer device 502 is a mobile phone as described in connection with FIG. 4A above, while the payee device 522 is a landline phone capable of generating a DTMF signal or any other type of in-band signal suitable for transmitting information regarding a payment and for activating a payment handler on the payer device 502. In addition to a conventional numeric keypad 540 for dialing, the payee device 522 may have a display 524, a payment request button 526, a confirmation button 528, and a cancel button 530, which allow the payee to initiate an electronic payment transaction and enter information regarding the payment (i.e., the payee's user ID and a requested amount). In other examples, the in-band signaling and input/output capabilities may be provided by an add-in module that is placed between a conventional landline phone and a phone line to the voice call network 490.

Figure 5A:
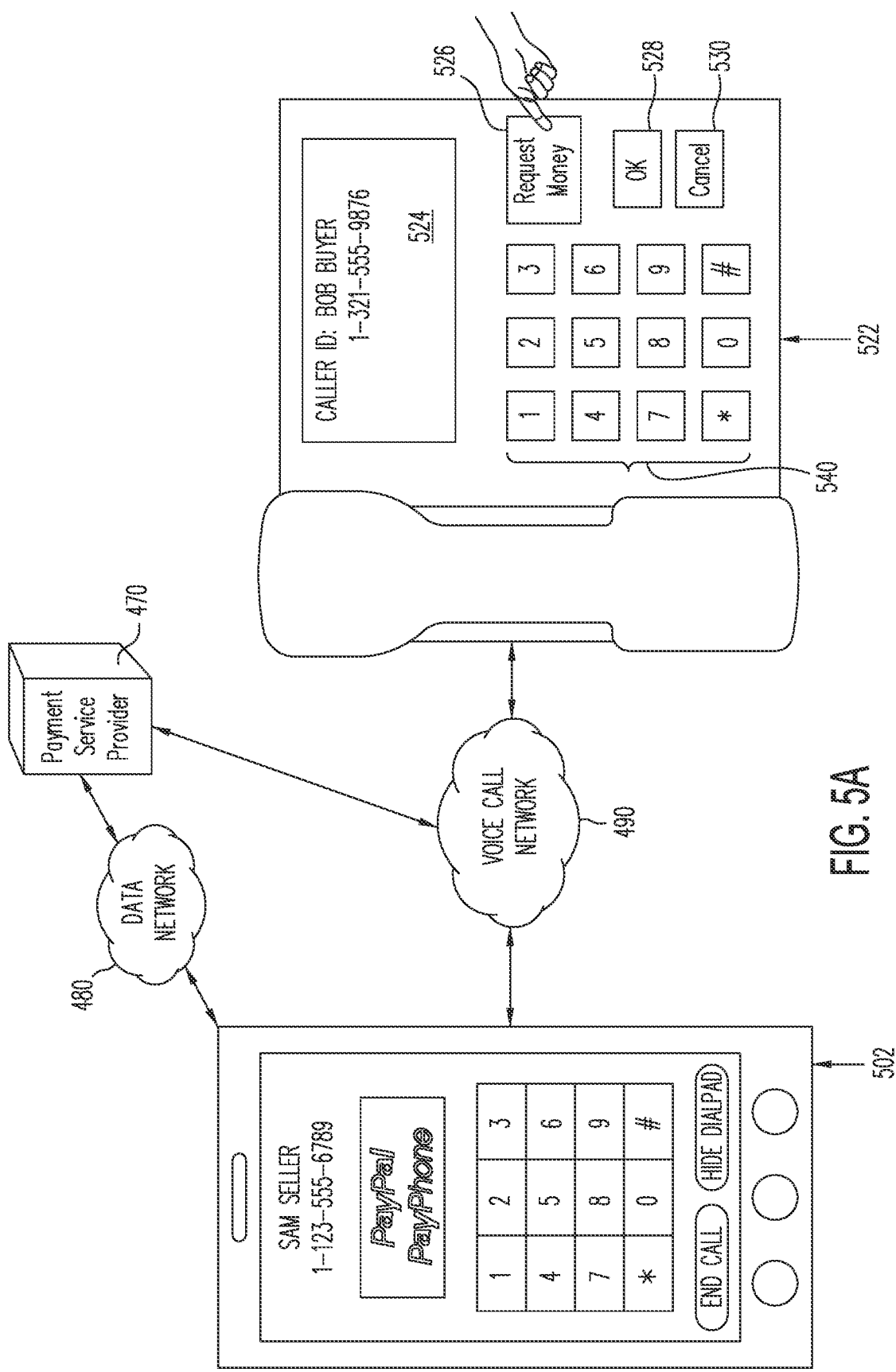
FIGS. 5A to 5D show exemplary screen displays of a payer's device and a payee's device when a payee-initiated electronic payment transaction is being processed during a phone call in an exemplary system.
Figure 5B:
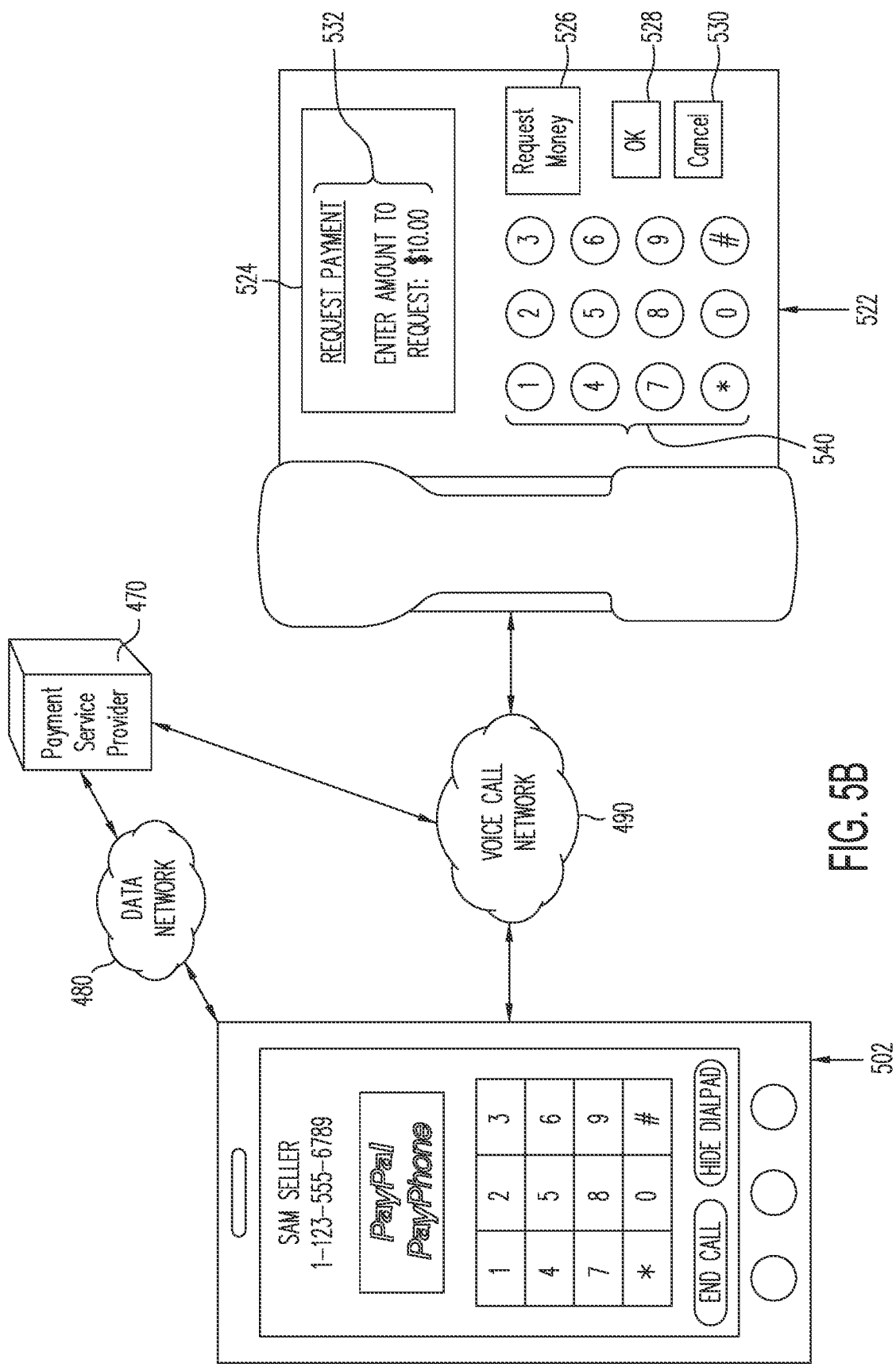

The payee can press the payment request button 526 as shown in FIG. 5A to initiate an electronic payment transaction during a phone call with a payer. A prompt 532 asking the payee to enter a requested amount is then presented on the display 524 on the payer device 522, as shown in FIG.

5B. As discussed above in connection with step 206, the payee may only need to enter the payee's own user ID once when the payee device 522 is first initialized, not every time when the payee initiates an electronic payment transaction. After the payee enters and confirms the requested amount using the keypad 540 and the confirmation button 528, the payee device 522 transmits to the payer device 502 over the voice call network 490 an in-band signal carrying the payment information (e.g., the payee's user ID and the requested amount) and a command to activate a payment handler. When the in-band signal is transmitted, the payee device 522 may also present a message 534 containing the requested amount and information regarding the payer (i.e., the payer's phone number retrieved from a caller/callee ID and the corresponding user ID retrieved from an address book if available) on the display 524, as shown in FIG. 5C.

Figure 5C:
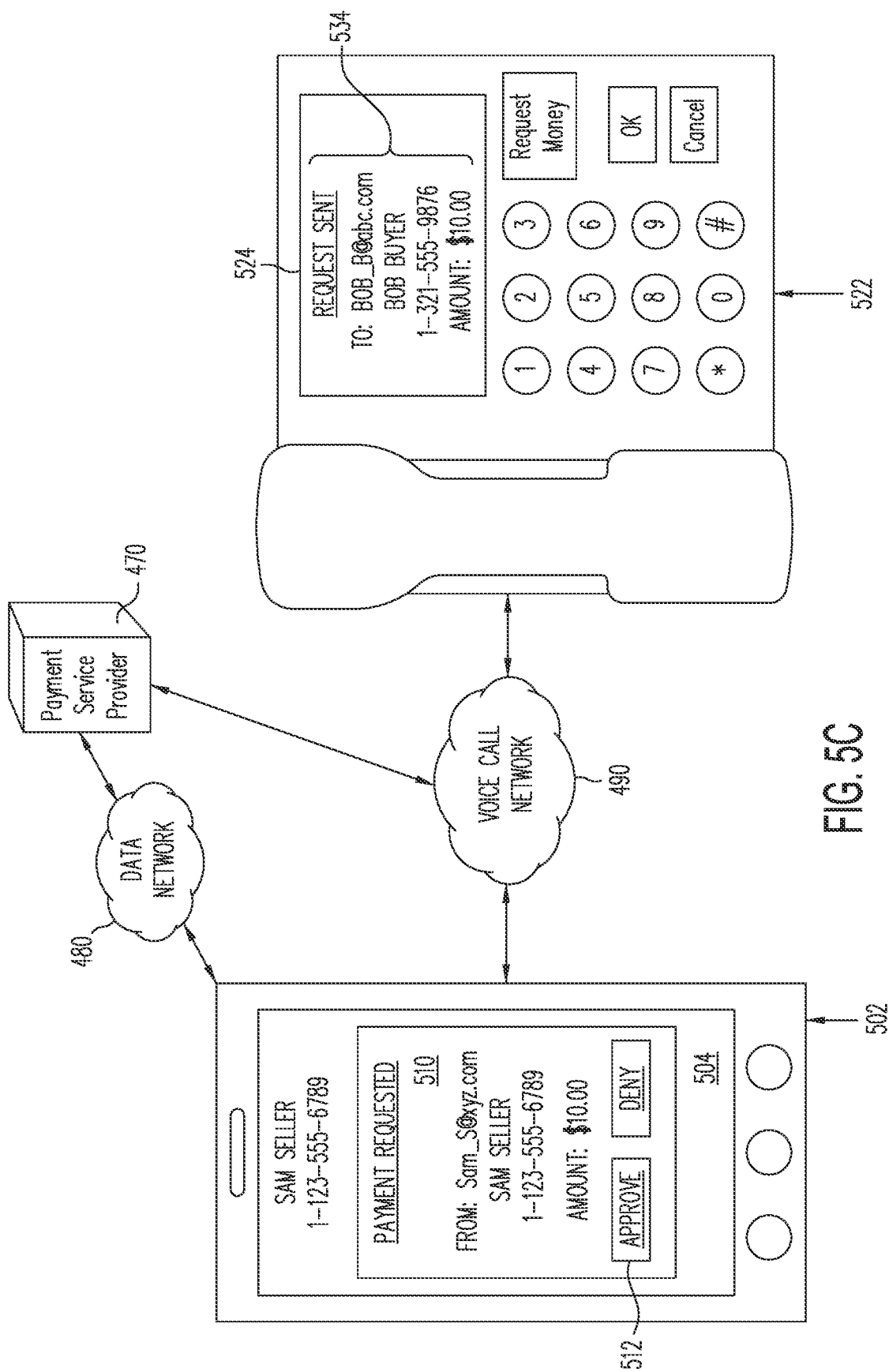

FIG. 5C also shows an exemplary screen display on the payer device 502 when the payment handler is activated in response to the in-band signal transmitted by the payee device 522. The payer device 502 may present on the display 504 a payment request prompt 510 containing the payment information (e.g., the payee's user ID and the requested amount) transmitted by the payee device 522. The payer can approve the payment by tapping on a confirmation button 512 presented in the prompt 510, after which the payer device 502 transmits a payment request over the data network 480 to a PSP server 470 for payment processing.

Figure 5D:
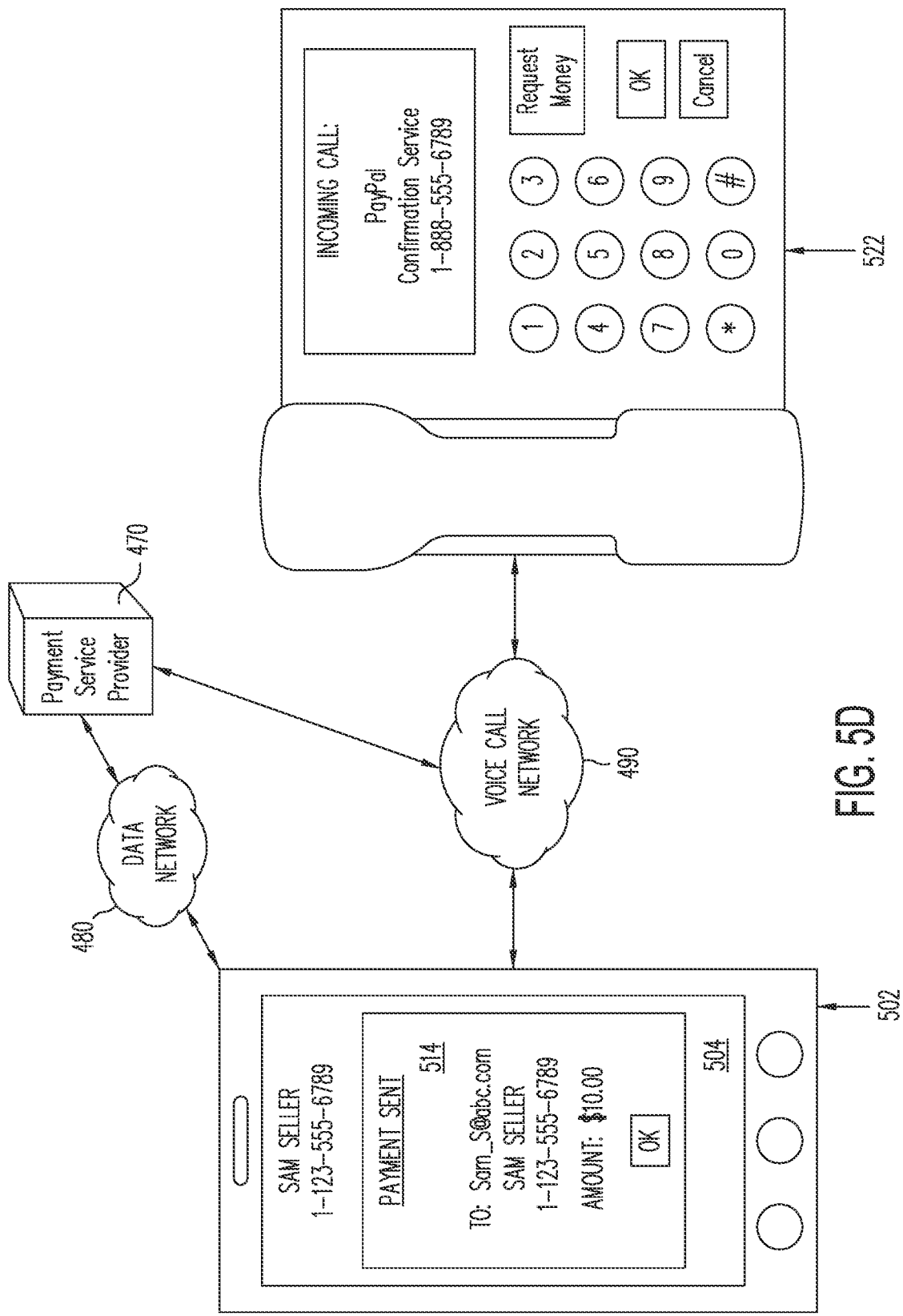

FIG. 5D shows the payer device 502 and the payee device 522 after the PSP server 470 has processed the payment request and transmitted notifications to both the payer and the payee. In this example, the payee has opted to receive a notification via an automated phone call. The PSP server 470 instantly calls the payee at the phone number associated with the payee's account, and the payee may pick up and listen to the incoming automated notification call through a call waiting service available from most landline phone operators. The payee may then return to the call with the payer, and acknowledge receipt of payment to complete the transaction. In another example, a voice alert may be injected into the voice call audio stream so that the payee can hear the notification while on the line. In yet another example, the notification may be transmitted to the payee device using DTMF signaling or any other type of in-band signaling. FIG. 5D also shows the payer being presented with a pop-up message 514 when the payer device 502 receives the notification over the data network 480.

Figure 6:
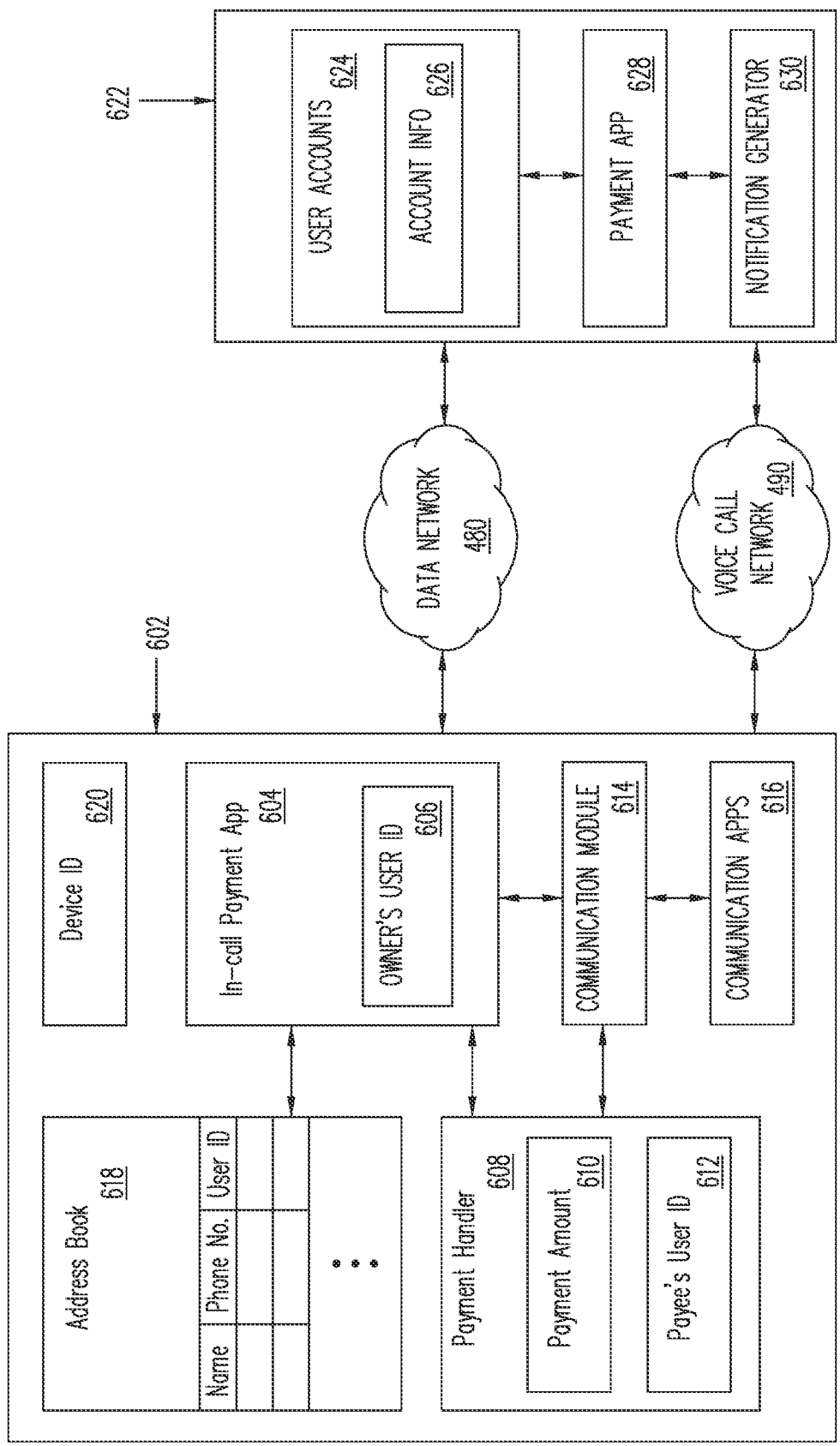
FIG. 6 is a block diagram illustrating data structures and processing modules suitable for performing one or more embodiments of the methods described herein.

FIG. 6 is a block diagram illustrating data structures and processing modules in a user device 602 (i.e., payer or payee device) that are suitable for performing one or more embodiments of the methods disclosed herein. FIG. 6 also shows data structures and processing modules in a PSP server 622 that are suitable for performing one or more embodiments of the methods.

The user device 602 may comprise an in-call payment app 604, which may present a custom dial-pad or in-call screen having a payment button, receive and store a device owner's user ID 606 for reuse, retrieve or store from an address book 618 user IDs of a party in a phone call, and detect and relay an activation command to a payment handler 608, according to one or more embodiments of the methods described herein. The user device 602 may include a payment handler 608, which receives a payment amount 610 and a payee's user ID 612 for generating a payment request to a PSP as described above. The in-call payment app 604 and the payment handler 608 may both interface with a communication module 614, which may provide an application programming interface ("API") for data and voice communication to and from the user device 602.

The user device 602 may further include other communication apps 616 as may be desired in particular embodiments. These apps may include a text messaging app, a web browser, an email client, a payment service client (e.g., PayPal Mobile app), and an online shopping app (e.g., eBay Mobile app). These communication apps may also receive a notification transmitted by a PSP in addition to, or in place of, the in-call payment app 604 or the payment handler 608. User device 602 also includes one or more device IDs 620 which may be implemented, for example, as operating system registry entries, cookies associated with the browser application, identifiers associated with the hardware of user device 602, or other appropriate identifiers, such as a phone number. In some embodiments, the user identifier may be used by a payment service provider to associate the owner of the user device 602 with a particular account as described in connection with step 116 in FIG. 1.

A PSP server 622 may have one or more payment applications 628, which may be configured to interact with the user device 602 over a data network 480 to facilitate electronic transfer of money between users of a PSP. In this regard, the one or more payment applications 628 may provide an API (such as PayPal API by PayPal, Inc.) through which the user device 602 can interact. The PSP server 622 may also maintain a plurality of user accounts 624, each of which may include account information 626 associated with individual users. For example, the account information 626 may include private financial information of users such as account numbers, passwords, credit card information, bank information, bank information, or other financial information which may be used to facilitate electronic transfer of money, as well as device information from a user device that aids in determining an appropriate account to access.

The PSP server 622 may also have a notification generator 630 suitable for generating notifications that may be received by the user device 602 during a phone call. The notification generator 630 may transmit a notification using an automated voice alert, an SMS text, a push notification message, an email, or other suitable means. The notification generator 630 may also communicate with the in-call payment app 604 or the payment handler 608 in the user device 602 to deliver a notification.

Figure 7:
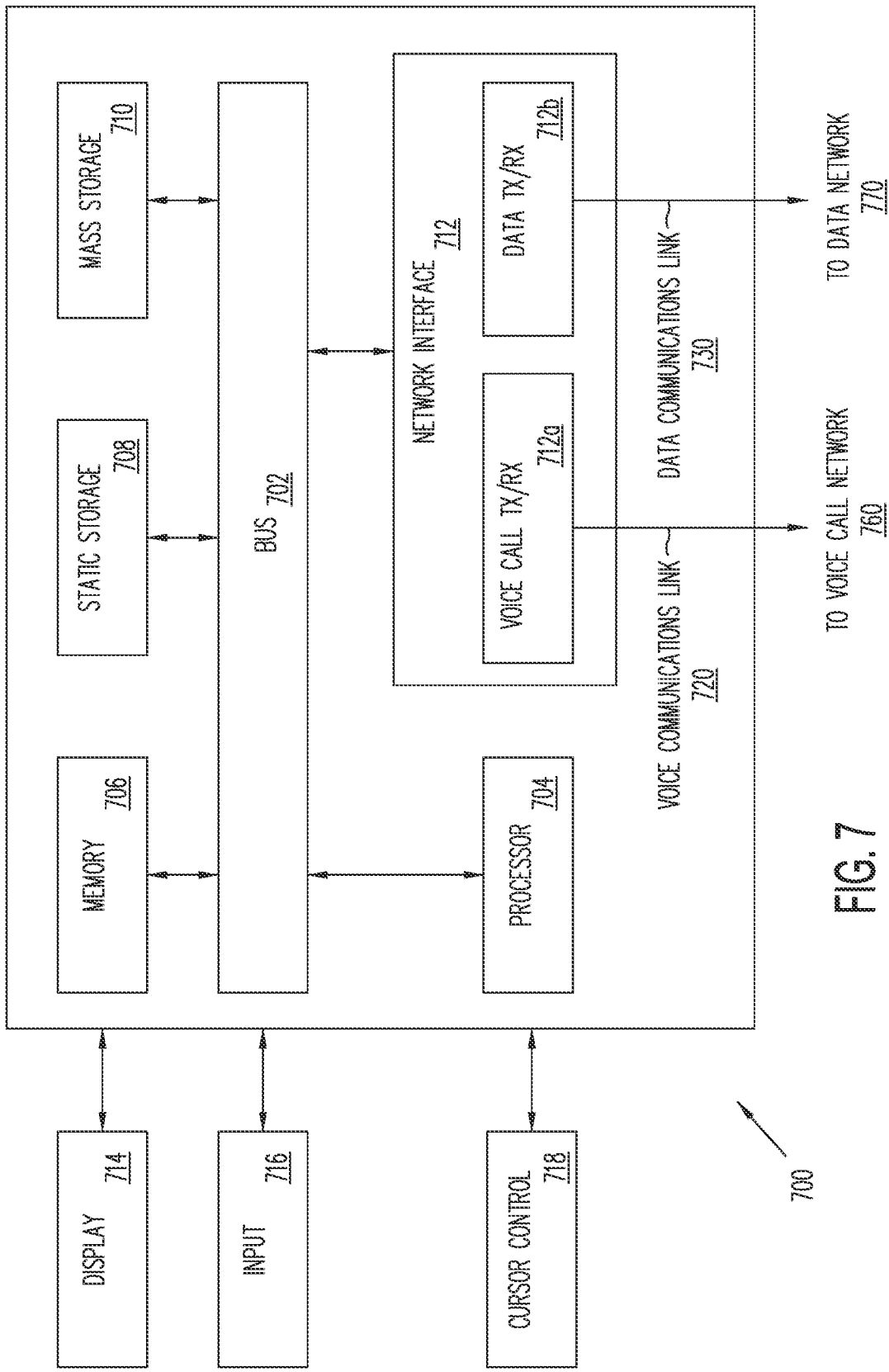
FIG. 7 is a block diagram of a computer system suitable for implementing the various devices and methods described herein.

FIG. 7 shows an embodiment of a computer system 700 suitable for implementing devices discussed herein, for example, a user device 602 and/or a PSP server 622. It should be appreciated that other devices utilized by users (i.e., payers or payees) and PSPs in the in-call payment system discussed above may be implemented as a computer system 700 in a manner as follows.

In accordance with various embodiments of the present disclosure, the computer system 700, such as a smart phone, a computer and/or a network server, may include a bus 702 or other communication mechanism for communicating information, which interconnects subsystems and components, such as a processing component 704 (e.g., processor, micro-controller, digital signal processor (DSP), etc.), a system memory component 706 (e.g., RAM), a static storage component 708 (e.g., ROM), a mass storage component 710 (e.g., a flash memory, magnetic, or optical drive), a network interface component 712 (e.g., modem or Ethernet card), a display component 714 (e.g., CRT or LCD), an input component 716 (e.g., keyboard, keypad, or virtual keyboard), and/or a cursor control component 718 (e.g., mouse, pointer, touch screen, or trackball). In one implementation, the mass storage component 710 may comprise a database having one or more mass storage components.

In accordance with embodiments of the present disclosure, the computer system 700 performs specific operations by the processor 704 executing one or more sequences of instructions contained in the system memory component 706, such as described herein with respect to the payer device(s), the payee device(s), and/or the payment service provider server(s). Such instructions may be read into the system memory component 706 from another computer readable medium, such as the static storage component 708 or the mass storage component 710. In other embodiments, hard-wired circuitry may be used in place of or in combination with software instructions to implement the present disclosure.

Logic may be encoded in a computer readable medium, which may refer to any medium that participates in providing instructions to processor 704 for execution. Such a medium may take many forms, including but not limited to, non-volatile media, volatile media, and transmission media. In various implementations, non-volatile media include optical or magnetic disks, such as the mass storage component 710, volatile media include dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 700. In various other embodiments of the present disclosure, a plurality of computer systems 700 coupled by a data communication link 730 to a data network 770 (e.g., such as a LAN, WLAN, PSTN, and/or various other wired or wireless networks, including telecommunications, mobile, and cellular phone networks) and/or coupled by a voice communication link 720 to a voice call network 760 (e.g., PSTN, PLMN, cellular network, or any combination of such networks that carry voice communication) may perform instruction sequences to practice the present disclosure in coordination with one another.

The computer system 700 may transmit and receive messages, data, information and instructions, including one or more programs (i.e., application code) through the data communication link 730 and a data transceiver subcomponent 712b of the network interface component 712. Received program code may be executed by the processor 704 as received and/or stored in the mass storage component 710 or some other non-volatile storage component for execution. The computer system 700 may transmit and receive audio signals through a voice communications link 720 and a voice call transceiver subcomponent 712a of the network interface component 712. The network interface component 712 may also include an antenna, either separate or integrated, to enable transmission and reception via the data communications link 730 and the voice communications link 720.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. A payment does not have to involve a purchase, but may be a loan, a charitable contribution, a gift, etc. Also, a payment may be split up and sent to any number of payees in a single transaction using a parallel payment or chained payment flow model supported by some PSPs such as PayPal, Inc. Furthermore, the various features and steps for the different embodiments can be added to and/or substituted with features of other embodiments described herein. Having thus described embodiments of the present disclosure, persons of ordinary skill in the art will recognize that changes may be made in form and detail without departing from the scope of the present disclosure. Thus, the present disclosure is limited only by the claims.

We claim:

1. A method, comprising:
   detecting, by a payment provider server comprising at least one processor, a first communication session between a first mobile device of a first user and a second mobile device of a second user;
   in response to a determination that the first communication session is associated with a transaction between the first user and the second user, communicating, by the payment provider server, with the first mobile device to cause to be displayed, via a first application of the first mobile device, a first user interface element, wherein the first user interface element is associated with the payment provider server, and wherein the first application uses the first communication session;
   responsive to detecting a selection of the first user interface element via the first application, determining, by the payment provider server, a first account associated with the first user and determining a second account associated with the second user, wherein the first account and the second account are associated with the payment provider server;

communicating, by the payment provider server, with the first mobile device to cause to be displayed, via the first application, a second user interface element that indicates the transaction between the first account and the second account; and responsive to detecting a selection of the second user interface element, processing the transaction using the first account and the second account.

2. The method of claim 1, further comprising:

responsive to said determining one or more of the first account and the second account, verifying, by the payment provider server, one or more of the first user or the second user via communicating with the first mobile device or the second mobile device, respectively.

3. The method of claim 1, wherein the first communication session is conducted over internet protocol (IP).

4. The method of claim 1, further comprising transmitting, by the payment provider server, a transaction completion notification to one or more of the first mobile device and the second mobile device.

5. The method of claim 1, further comprising responsive to said detecting the selection of the first user interface element, communicating, by the payment provider server, with the first mobile device to prompt the first user, via the first application, to provide a payment amount for the transaction.

6. The method of claim 1, further comprising responsive to said detecting the selection of the first user interface element, communicating, by the payment provider server, with the first mobile device to prompt the first user, via the first application, to provide a user identifier corresponding to the second user.

7. The method of claim 1, wherein said determining the second account associated with the second user is based on a user identifier associated with the transaction.

8. The method of claim 1, wherein the selection of the second user interface element indicates a request for processing of the transaction using the second account and the first account.

9. A payment provider server comprising:

a non-transitory memory storing instructions; and a processor coupled with the non-transitory memory and configured to execute the instructions from the non-transitory memory to cause the payment provider server to:

detect a first communication session between a first user device of a first user and a second user device of a second user;

in response to a determination that the first communication session is associated with a transaction between the first user and the second user, communicate with the first user device to cause to display a first user interface element via a first application at the first user device, wherein the first user interface element is associated with the payment provider server that is operable to process the transaction, and wherein the first application uses the first communication session;

in response to a detection of a selection of the first user interface element, determine a first account and a second account at the payment provider server that are associated with the first user and the second user, respectively;

communicate with the first user device to display a second user interface element via the first application, wherein the second user interface element is associated with the transaction between the first account and the second account; and in response to a detection of a selection of the second user interface element, process the transaction between the first account and the second account.

10. The payment provider server of claim 9, wherein executing the instructions further causes the payment provider server to, in response to the determination of the one or more of the first account and the second account, verify one or more of the first user or the second user via communicating with the first user device or the second user device, respectively.

11. The payment provider server of claim 9, wherein executing the instructions further causes the payment provider server to transmit a transaction completion notification to the first user device or the second user device.

12. The payment provider server of claim 9, wherein executing the instructions further causes the payment provider server to, in response to the detection of the selection of the first user interface element, communicate with the first user device to prompt the first user, via the first application, to provide a payment amount for the transaction.

13. The payment provider server of claim 9, wherein executing the instructions further causes the payment provider server to, in response to the detection of the selection of the first user interface element, communicate with the first user device to prompt the first user, via the first application, to provide a user identifier corresponding to the second user.

14. The payment provider server of claim 9, wherein the selection of the second user interface element indicates a request for processing of the transaction using the second account and the first account.

15. A non-transitory machine-readable medium storing instructions that, when executed by a payment provider server that comprises one or more processors, cause the payment provider server to perform operations comprising:

detecting a first communication session between a first mobile device of a first user and a second mobile device of a second user;

in response to a determination that the first communication session is associated with a transaction between the first user and the second user, communicating with the first mobile device to cause the first mobile device to display a first user interface element via a first application at the first mobile device, wherein the first user interface element is associated with the payment provider server, and wherein the first application uses the first communication session;

in response to a detection of a selection of the first user interface element, determining a first account and a second account at the payment provider server that are associated with the first user and the second user, respectively;

communicating with the first mobile device to display a second user interface element via the first application, wherein the second user interface element is associated with the transaction between the first account and the second account; and in response to a detection of a selection of the second user interface element, processing the transaction between the first account and the second account.

16. The non-transitory machine-readable medium of claim 15, wherein the instructions, when executed by the payment provider server, further cause the payment provider server to perform operations comprising:

verifying, based on one or more of the first account and the second account, one or more of the first user or the second user via communicating with the first mobile device or the second mobile device, respectively.

17. The non-transitory machine-readable medium of claim 15, wherein the instructions, when executed by the payment provider server, further cause the payment provider server to transmit a transaction completion notification to the first mobile device or the second mobile device.

18. The non-transitory machine-readable medium of claim 15, wherein the instructions, when executed by the payment provider server, further cause the payment provider server to perform operations comprising: responsive to the detection of the selection of the first user interface element, communicating with the first mobile device to prompt the first user, via the first application, to provide a payment amount for the transaction.

19. The non-transitory machine-readable medium of claim 15, wherein the instructions, when executed by the payment provider server, further cause the payment provider server to perform operations comprising: responsive to the detection of the selection of the first user interface element, communicating with the first mobile device to prompt the first user, via the first application, to provide a user identifier corresponding to the second user.

20. The non-transitory machine-readable medium of claim 15, wherein the selection of the second user interface element indicates a request for processing of the transaction using the second account and the first account.

\* \* \* \* \*